(No Model.) 3 Sheets—Sheet 1.

C. J. VAN DEPOELE.
COMBINED ELECTRIC MOTOR AND GENERATOR.

No. 257,990. Patented May 16, 1882.

Attest:
A. Barthel
E. Scully

Inventor:
Charles J. Van Depoele
by Phil. S. Sprague
Att'y (No Model.) 3 Sheets—Sheet 2.

C. J. VAN DEPOELE.
COMBINED ELECTRIC MOTOR AND GENERATOR.

No. 257,990. Patented May 16, 1882.

Attest:
A. Barthel
E. Scully

Inventor:
Charles J. Van Depoele
by Thos. A. Sprague
Att'y

N. PETERS. Photo-Lithographer. Washington. D. C.

(No Model.) 3 Sheets—Sheet 3.
C. J. VAN DEPOELE.
COMBINED ELECTRIC MOTOR AND GENERATOR.
No. 257,990. Patented May 16, 1882.
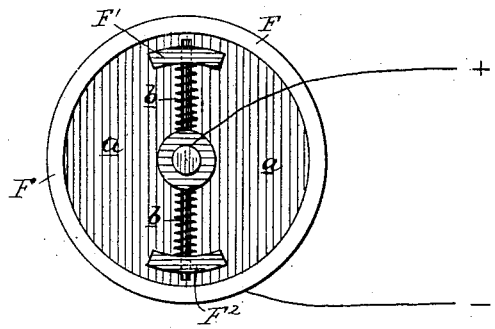
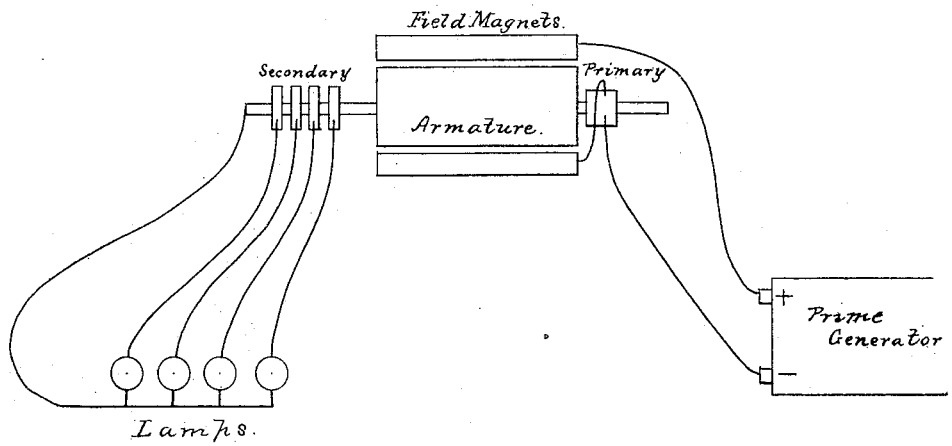
WITNESSES
A. B. Robertson
W. T. Robertson
INVENTOR
Charles J. Van Depoele
BY T. J. W. Robertson
Attorney

UNITED STATES PATENT OFFICE.

CHARLES J. VAN DEPOELE, OF CHICAGO, ILLINOIS.

COMBINED ELECTRIC MOTOR AND GENERATOR.

SPECIFICATION forming part of Letters Patent No. 257,990, dated May 16, 1882.

Application filed April 8, 1881. (No model.)

*To all whom it may concern:*

Be it known that I, CHARLES J. VAN DEPOELE, of Chicago, in the county of Cook and State of Illinois, have invented an Improvement in a Combined Electric Motor and Current-Generator, of which the following is a specification.

My invention consists in the construction of an electric motor, the armature of which is so constructed as to revolve and emit power when a current of the necessary strength is circulating through it and its magnetic field-coils, and simultaneously, by means of induction, to produce a number of independent currents, each capable of giving an electro-motive force as long as the motor is running under the action of the current provided for it by any suitable dynamo-machine.

Figure 1:
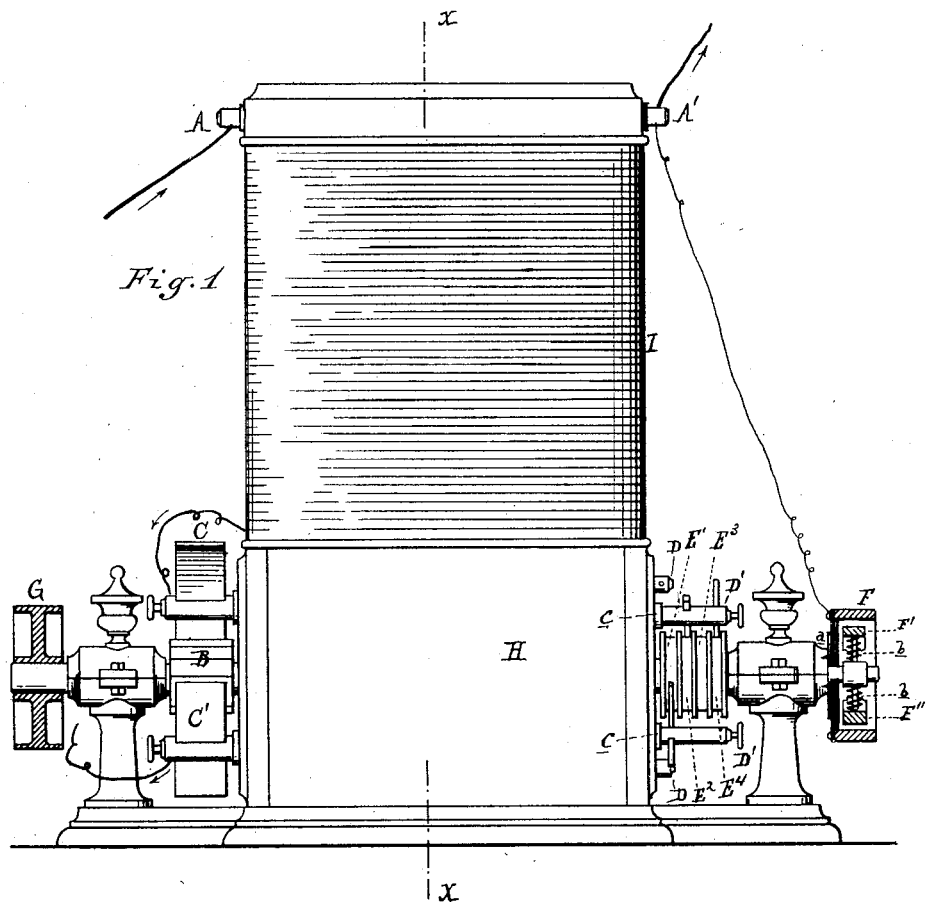
Figure 2:
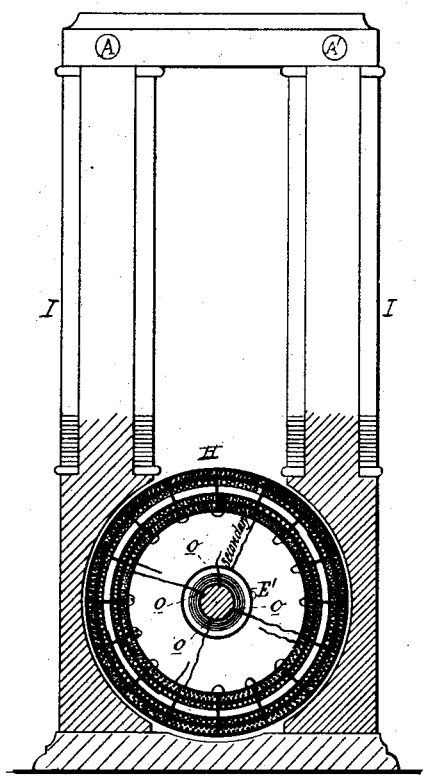
Figure 3:
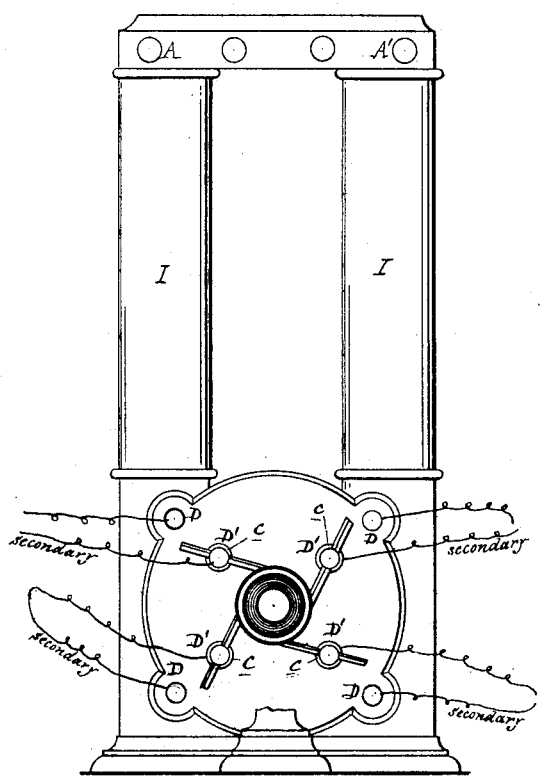
Figure 4:
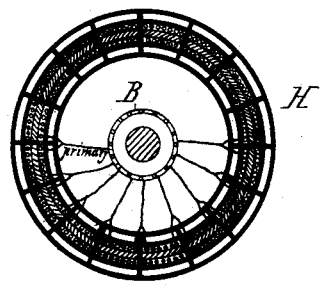

Figure 1 is a side elevation of my motor and current-generator combined. Fig. 2 is a vertical section of the same on the line $x\,x$ in Fig. 1. Fig. 3 is an end view, showing commutator, brushes, and brush holders or collectors for collecting induced currents to be used for lighting or other purposes. Fig. 4 is a view showing the circuit-connections. Fig. 5 is an end view of the regulator. Fig. 6 is a diagram representing the mode of connecting the generator with the motor and the motor with the lamps.

In the accompanying drawings, which form a part of this specification, A A' represent the binding-posts for the wires leading to and from any suitable dynamo or electro machine wherein the main current is obtained. B is a commutator. C C' are brushes. D D' are brush-holders and binding-posts for the current-generating device. E' E² E³ E⁴ are independent commutator-rings receiving or giving passage to the induced currents of the armature. Independent from the main current. F is a speed-regulator, and G a pulley to transmit power.

B is the commutator for the main current, and is connected to the armature in the ordinary way. The independent commutators E' E² E³ E⁴ are connected with the secondary coils of the armature, whence they derive induced currents. H is an armature, made in sections, as shown in Fig. 2. I I are the cores of field-of-force magnets.

The current from a dynamo-machine or other source properly connected by wires with the machine under consideration enters at the post A, thence passes through the magnet-coils or field-of-force to the brush and holder C, thence through the commutator B, armature-coils H, thence out to brush and holder C', to binding-post A', (through opposite magnet-coil,) and back to the dynamo-machine, or to the next engine, or to lamps, as the case may be. As soon as the current is established the armature H, with its pulley G, will commence to revolve with great rapidity, and would attain an indefinite velocity commensurate with the work to be done by the power transmitted through the pulley properly connected by a belt to the mechanism to be driven. This, while it might prevent too great velocity, would not regulate the speed of the revolutions of the armature and pulley. To automatically regulate this speed, I provide a regulator or governor, F, secured on the end of the armature-shaft, as shown in Fig. 1, and which is constructed and operates as follows: One of the binding-posts—say A—is in permanent connection with the metallic frame of the machine, so that the flies F' F² form one pole of the circuit. The second binding-post, A', which is insulated from the rest of the machine, is connected to the ring F, which is also electrically insulated from the machine by means of a disk, $a$, of any suitable non-conducting material, fixed to the box in which the armature-shaft runs. The ring is secured rigidly to this box, and the flies are secured at the end of spring-arms $b$, which are secured to a hub secured upon the shaft.

It will be readily understood that at a certain speed the flies will be thrown out into contact with the ring. When such contact takes place the current is short-circuited from the magnetic coils and passes by to the main line. Under this condition the speed of the armature will be reduced, when presently the flies, obedient to the antagonistic force of the springs in their arms, will break contact with the ring, allowing the current, as before, to flow through the magnetic coils, and so on as long as the motor is running.

The secondary currents are produced in the sections of the armature, which is constructed as follows: The primary wire of the armature is wound on the iron bars of the frame, as described and shown in a dynamo-electric machine and patent therefor issued to me September 21, 1880. One section of wire is wound on each iron bar. The terminals of said wire are properly connected and brought out to a commutator, as usual. Each of these sections is well covered by a good insulator and wound over with a second wire of smaller dimensions than the first. This secondary coil is again well insulated from its neighbors, as it is intended to produce currents of high intensity. Several of these secondary coils can be connected together in series for quantity, or they can be used separately. In the drawings, Fig. 2, four sections are connected up in series. One of the terminals is to the shaft of the machine at $o$, while the other terminal is brought to one of the well-insulated commutator-rings, E', and there collected by one of the brushes and holders, D. Each of the sections is similarly connected to its proper ring. The armature now being revolved by the application of a proper current changes constantly and rapidly the polarity of the different sections comprised in said armature, and on each reversal induces a current in the secondary wire of each section which will be alternate in character. Any desired combination can be made in the connecting up of the different sections to suit the required wants. All that is now necessary is to collect said currents for outside use. To do this, attach conducting-wires to the post D and brush-holders D', the former being in contact with the frame of the machine and the latter to a plate, $c$, of some non-conducting substance. Said conducting-wires can now be led to a properly-constructed lamp or lamps and used for lighting purposes.

It will be remembered that on closing the secondary circuit a portion of the power of the motor is absorbed by said secondary current, which runs in opposite direction to that of the primary currents. Thus when light is expected only a proportionate part of the power can be utilized; or the whole of the power may be used to run machinery, so long as the secondary currents are not closed; or the whole of the force can be utilized at will to generate induced currents for lighting.

What I claim as my invention is—

1. An electric motor the armature of which is wound with a primary and a secondary wire, the former to be used as the motive force and at the same time to induce currents of alternating directions in the latter when in operation, substantially as described.

2. In an electric motor and current-generating machine, and in combination with the field-magnets thereof, an armature consisting of insulated sections combined to form a ring or cylinder, each section being composed of a curved core and a primary and a secondary coil, all insulated from each other, substantially as described.

3. An electromotor the armature of which is wound with a primary and a secondary wire, in combination with an electric generator for supplying an electric current to said motor and circuit-connections for carrying off the current from the secondary wire, substantially as and for the purpose specified.

4. The combination, with a motor or motors provided with an armature or armatures having primary and secondary coils, of an electric generator producing motive power in said motor or motors and a lamp-circuit connecting with the secondary coils of said armature or armatures, as and for the purpose specified.

5. In combination with an electromotor and current-generating machine, a regulator or governor consisting of an insulated ring, F, and a series of fliers adapted to "short-circuit" the motor when the speed becomes excessive, substantially as described.

6. A governor for electric motors, consisting of a metal ring, F, supported and insulated from the motor by a non-conducting disk, $a$, and a series of fliers, F' F'', mounted on the shaft of the motor, both the ring and the fliers being suitably connected with the main circuit, substantially as specified.

CHARLES J. VAN DEPOELE.

Witnesses:
ALLEN A. GRIFFITH,
JOHN SCULLY